United States Patent
Williamson et al.

[11] Patent Number: 5,843,383
[45] Date of Patent: Dec. 1, 1998

[54] POLLUTANT REMEDIATING CORONA DISCHARGE CHAMBER

[75] Inventors: Weldon S. Williamson; Eun-Hee Cirlin, both of Malibu; Franklin A. Dolezal, Reseda; Robin J. Harvey, Thousand Oaks, all of Calif.

[73] Assignee: Hughes Electronics Corporation, El Segundo, Calif.

[21] Appl. No.: 866,871

[22] Filed: May 30, 1997

Related U.S. Application Data

[62] Division of Ser. No. 450,449, May 25, 1995, Pat. No. 5,695,619.

[51] Int. Cl.$^6$ ...................................................... B01J 19/08
[52] U.S. Cl. ...................... 422/186.04; 422/907; 588/227
[58] Field of Search ...................... 588/227; 422/186.04, 422/907

[56] References Cited

U.S. PATENT DOCUMENTS

| | | | |
|---|---|---|---|
| 4,695,358 | 9/1987 | Mitzuno et al. | 204/174 |
| 4,960,570 | 10/1990 | Mechtersheimer | 422/186.07 |
| 5,433,832 | 7/1995 | Rich et al. | 204/164 |
| 5,490,973 | 2/1996 | Grothaus | 422/186.04 |
| 5,549,795 | 8/1996 | Gregsire et al. | 204/164 |

FOREIGN PATENT DOCUMENTS

| | | |
|---|---|---|
| 0698953 A1 | 2/1996 | European Pat. Off. . |
| 4235766 C1 | 5/1994 | Germany . |

OTHER PUBLICATIONS

Puchkarev et al., "Toxic Gas Decomposition by Surface Discharge", *Proceedings of the 1994 International Conf. on Plasma Science*, 6–8 Jun. 1994, Santa Fe, New Mexico, paper No. 1E6, p. 88.

Yamamoto et al., "Decomposition of Volatile Organic Compounds by a Packed Bed Reactor and a Pulsed–Corona Plasma Reactor", *Non–Thermal Plasma Techniques for Pollution Control*, NATO ASI Series vol. G34 Part B, Ed. by B.M. Pentrante and S.E. Schultheis, Springer–Verlag Berlin Heidelberg, 1993, pp. 87–89 (No month available).

Rosocha et al., "Treatment of Hazardous Organic Wastes Using Silent–Discharge Plasmas", *Non–Thermal Plasma Techiques for Pollution Control*, NATO ASI Series vol. G34 Part B, Ed. By B.M. Penetrante and S.E. Schultheis, Springer–Verlag Berlin Heidelberg, 1993, pp. 79–90 (No month available).

Chang et al., "Mechanism of Pulse Corona Induced Plasma Chemical Process for Removal of $No_x$ and $SO_x$ from Combustion Gases", *Conference Record of the IEEE Industry Applications Society*, 1988, pp. 1628–1635 (No month available).

*Primary Examiner*—Kathryn L. Gorgos
*Assistant Examiner*—Kishor Mayekar
*Attorney, Agent, or Firm*—V. D. Duraiswamy; W. K. Denson-Low

[57] ABSTRACT

A pollutant destruction system connects a capacitive corona discharge chamber in a self-resonant circuit with an inductive element. Intermittent energizing signals are furnished from a power supply to induce corona discharges within the chamber, with the resonant circuit responding to the energizing signals by initiating additional corona discharges between energizing signals in a highly energy efficient operation. One or more discharge chambers can be provided in the resonant circuit, with each discharge chamber comprising a dielectric enclosure with a distributed electrode outside and an elongate electrode inside the enclosure. The inner electrode can extend either along the chamber axis, or along the inner chamber wall for better support and heat dissipation. The energizing pulse frequency can be controlled in various ways, such as in response to a termination of corona discharges, an increase in the pollutant concentration or an acceleration of an engine whose exhaust is being treated, or the pulses can be applied at a fixed rate.

4 Claims, 3 Drawing Sheets

U.S. Patent   Dec. 1, 1998   Sheet 1 of 3   5,843,383
FIG. 1.
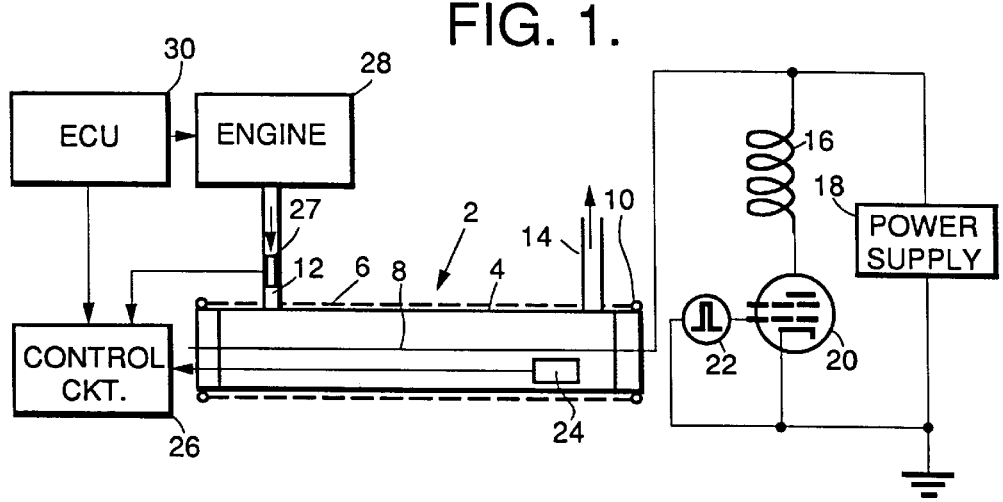
FIG. 2.
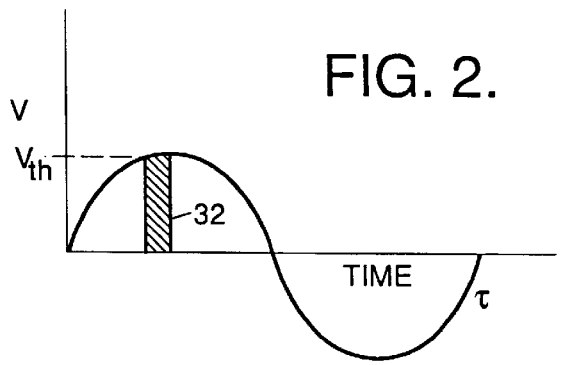
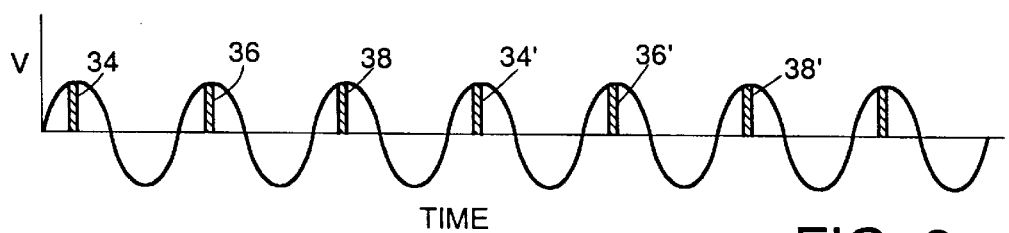
FIG. 3.
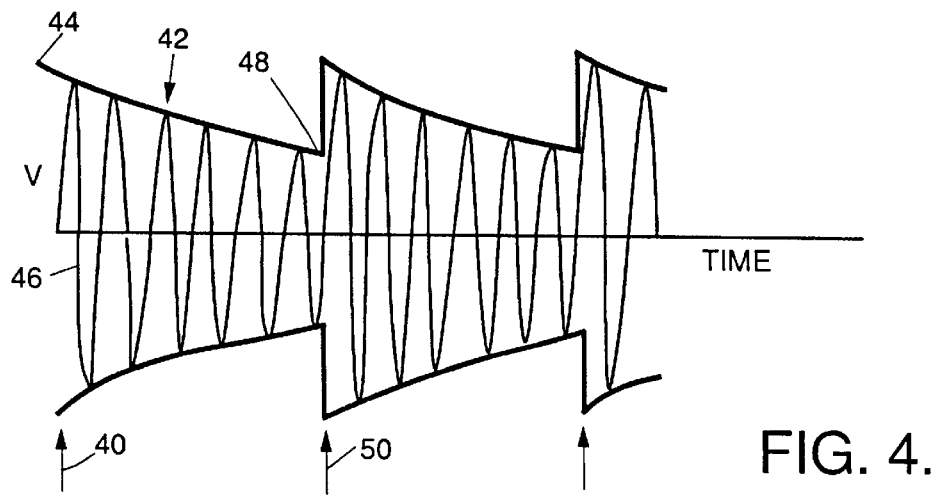
FIG. 4.

POLLUTANT REMEDIATING CORONA DISCHARGE CHAMBER

This is a division of application Ser. No. 08/450,449 filed May 25, 1995 now U.S. Pat. No. 5,695,619

BACKGROUND OF THE INVENTION

1. Field of the Invention

This invention relates to the destruction of fluidborne pollutants by corona discharges.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge", *Proceedings of the* 1994 *International Conf. on Plasma Science*, 6–8 Jun. 1994, Santa Fe, N.M., paper No. 1E6, page 88, which shows that the energy required for destruction is generally in the 300–1,000 Joules/liter range. Corona pollutant destruction has also been proposed for liquids, as disclosed in application Ser. No. 08/295,959, filed Aug. 25, 1994, "Corona Source for Producing Corona Discharge and Fluid Waste Treatment with Corona Discharge", and assigned to Hughes Aircraft Company, the assignee of the present invention.

In one system, described in Yamamoto et al., "Decomposition of Volatile Organic Compounds by a Packed Bed Reactor and a Pulsed-Corona Plasma Reactor", *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 5–10 keV. A similar system is described in Pat. No. 4,695,358, in which pulses of positive DC voltage are superimposed upon a DC bias voltage to generate a streamer corona for removing $SO_x$ and $NO_x$ from a gas stream. These processes have relatively poor energy efficiencies. With the reactor geometries that have been selected, it is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is actually used in the corona reaction, and simply decays away into heat after each pulse without contributing to the pollutant destruction.

A similar approach, but with a different reactor geometry, is taken in Rosocha, et al., "Treatment of Hazardous Organic Wastes Using Silent-Discharge Plasmas", *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

SUMMARY OF THE INVENTION

The present invention seeks to provide a system and method for remediating fluid borne pollutants that requires significantly less energy than in the past without detracting from its destruction capabilities.

The goal is achieved by connecting a capacitive corona discharge chamber in a resonant circuit with an inductive element. External energizing pulses are applied to the circuit only as necessary to sustain the generation of corona pulses, with corona pulses between the external signals generated by the self-resonance of the circuit itself. Various resonant circuit configurations can be used, such as a single corona discharge chamber and inductive element connected in a loop, a ringing circuit between one inductive element and a pair of discharge chambers, and an inductive element connected in parallel with multiple discharge chambers.

The discharge chamber is preferably implemented as a dielectric enclosure with a distributed electrode outside the enclosure and a elongate electrode inside. The inner electrode, preferably an insulated wire, can either extend along a central axis of the chamber or can be offset from the central axis. In the latter case the inner electrode preferably extends along an inner wall of the chamber; when the chamber has a polygon shape the inner electrode preferably extends along one of the polygon vertices.

To increase the flow path, multiple corona discharge chambers can be arranged in an array with adjacent flow paths, with the inductive element connected in a resonant circuit with each of the discharge chambers.

Various mechanisms can be used to control the application of energizing pulses to the self-resonant circuit. These include the supply of energizing signals in response to a sensed termination of corona discharges within the chamber, modulating the energizing signal rate in response to the level of pollution in the fluid stream and, when the discharge chamber is used to remove pollutants from an engine exhaust, varying the energizing signal rate with the engine acceleration.

These and other features and advantages of the invention will be apparent to those skilled in the art from the following detailed description, taken together with the accompanying drawings.

BRIEF DESCRIPTION OF THE DRAWINGS

FIG. 1 is a block diagram of a pollutant destruction system in accordance with the invention, illustrating alternative control mechanisms for applying energizing signals to a self-resonant corona discharge circuit;

FIG. 2 is a voltage-time graph illustrating one cycle of the self-resonant corona discharge circuit, and the portion of the cycle during which an outside energizing pulse is supplied to the circuit;

FIG. 3 is a voltage-time graph illustrating the intermittent application of energizing signals to the self-resonant circuit;

FIG. 4 is a voltage-time graph illustrating the discharge voltage pattern of the circuit;

DETAILED DESCRIPTION OF THE INVENTION

Figure 5A:
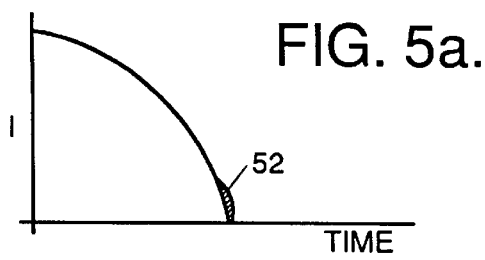
FIGS. 5*a*, 5*b* and 5*c* are respectively current, voltage and phase diagrams illustrating the corona chamber's voltage-current relationship during a corona discharge.

The present invention provides a way to destroy organic pollutants in air streams by bombarding the gas with energetic electrons generated by corona emission. The mechanisms for the destruction of pollutants by electron bombardment include conventional bond-breaking by direct electron impact on a pollutant molecule, and oxidation of pollutant molecules by free radicals formed by electron impact on other constituents of the gas stream. The invention has numerous applications, such as cleaning volatile organic compounds in stack and flue gases, purifying contaminated air such as that found in "sick buildings" or automobiles driven in smoggy areas, replacing or supplementing catalytic converters used to treat automobile or other engine exhausts, and purifying the air in recirculated air systems such as those found in airplanes and hospitals.

While somewhat resembling prior pulsed-corona reactors, the invention requires a specific energy (energy needed to treat a given volume of air at standard temperature and pressure) that is at least an order of magnitude less than the best previously published results. As opposed to a specific energy of 148 J/liter achieved by Yamamoto et al., supra, based upon a rotating spark gap used to trigger a pulsed corona discharge, the invention has been found to require only 13 J/liter to destroy a representative pollutant, toluene vapor, at a concentration of about 100 ppm. Conventional technology such as incinerators and flares require 1,900–11,000 J/liter for equivalent destruction and removal efficiencies (DREs).

FIG. 1 illustrates a preferred embodiment of the invention in a simplified block diagram format. A corona discharge chamber or reactor 2 is formed from a hollow dielectric cylinder 4 with a wire mesh or solid electrode 6 on the outside of the cylinder which may be a solid metal tube, or thin electroplated or evaporated coating, and an conducting wire electrode 8 extending axially through the inside of the reactor. The dielectric used for the reactor wall is preferably a low loss tangent material such as a ceramic or glass; silica was used in a demonstration of the invention. Corona rings 10 are preferably provided at the ends of the outer electrode 6 to suppress corona in these regions. The inner electrode 8 has a diameter that is small enough, preferably on the order of about 50 micrometers, to produce electric fields at its surface high enough to permit corona emission. The reactor includes an inlet conduit 12 through which polluted gas is emitted into the interior of the cylinder, and an outlet conduit 14 through which the gas exits after having had its pollutants remediated by a corona discharge treatment.

The reactor cell forms a capacitor across which an inductor 16 is connected to establish an LC resonant circuit; the opposite ends of inductor 16 are connected respectively to the inner and outer reactor electrodes 8 and 6. The resonant circuit is energized by a simple high-voltage pulser which is shown as a high voltage (preferably about 10 kV) power supply 18 connected in series with the resonant circuit and a switch 20, which may be implemented by a vacuum tetrode or other means. A control element, illustrated as pulse generator 22, applies time-spaced pulses to close the switch 20, with the switch remaining open between successive pulses. With each pulse current flows into the capacitance of the reactor, charging it to the power supply's voltage level and initiating a corona discharge pulse within the reactor.

The resonant circuit has a radio frequency (RF) resonant frequency, with the switch closed to supply an energizing pulse during a portion of one half-cycle of the resonant period. During the next half-cycle of the LC resonant period (which is equal to $½\pi\sqrt{LC}$), the switch is open and current flows out of the reactor capacitance and into the inductor 16. Another half-period later the current flows back into the reactor capacitance, initiating another corona discharge pulse with no additional energy being drawn from the power supply, since the switch remains open. This oscillation, in which a corona discharge is produced during every other half-period, continues until the voltage decays below the threshold for initiating a discharge. Another pulse is then provided from the power supply to reactivate the self-oscillation process.

The entire energy of the power supply pulse (except for very small circuit losses) is thus utilized in the reactor. The energy is cycled back and forth between the reactor and the inductor until corona action ceases, and the residual energy still remains in the circuit when the next energizing pulse is presented to boost it back to corona-producing levels.

The resonant circuit's natural frequency is preferably on the order of about 1 MHz, with the effective reactor charging time during which the reactor capacitance is charged up typically extending for only about 10–20 nanoseconds; the corona discharge lasts only for this charging period.

A natural frequency of about 1 MHz is suitable for treating gaseous flow rates on the order of 100 $cm^3$/min. (with a corona discharge chamber about one-quarter meter long). A higher frequency would generally be desirable for higher gaseous flow rates. The system's natural frequency can be increased by making the chamber walls thicker and thereby reducing its capacitance, making the inductor smaller, or both.

Various mechanisms can be used to control the timing of the energizing pulses from the power supply 18 to the corona reactor. In all cases energizing pulses will be applied intermittently, with intervals between pulses that considerably exceed the duration of the pulses themselves. One approach is to simply have the pulse generator 22 pulse the switch 20 closed at periodic intervals, such as once every five or ten self-resonant periods of the corona discharge circuit. However, this can result in less than optimum energy efficiency if the circuit still has sufficient residual energy from the previous pulse to continue corona discharges through self-resonance, or in less than complete pollutant destruction if the corona discharges have terminated too long before the next energizing pulse.

Various feedback mechanisms can be provided to establish a more active control over the timing of energizing pulses. For example, a sensor 24 can be positioned at the output of the reactor to sense the remaining concentration of pollutants, and in response active a control circuit 26 that initiates a pulse from pulse generator 22 to close the switch 20 and thereby provide another energizing pulse. Alternatively, a sensor 27 could be used to sense the level of pollutants within the gas stream entering the reactor, with control circuit 26 increasing the frequency of energizing pulses for higher pollutant levels and reducing the energizing pulse frequency for lower levels. When the reactor is used to remediate pollutants from the exhaust of an engine 28, such as in an automobile, the pollutant level will increase during engine acceleration. In this case, instead of directly sensing the pollutant level in the exhaust stream, throttle opening can be identified as a signal from the engine control unit 30, the output of which is applied to the control circuit 26 to increase the energizing pulse frequency during accelerations.

FIG. 2 illustrates the contrast between the reactor circuit's resonant period τ and the period during which a corona discharge occurs plotted against the voltage differential between the two reactor electrodes. A corona discharge does not begin until the voltage exceeds the discharge threshold $V_{th}$, and lasts until the reactor capacitance has been charged. This discharge period 32 is indicated by shading in FIG. 2, and as mentioned above is typically about 10–20 nanoseconds, as opposed to a resonant period of perhaps 1 microsecond.

FIG. 3 illustrates an application in which an energizing pulse is applied to the resonant reactor circuit during every third resonant cycle (varying peak voltage levels are not shown in this drawing). An energizing pulse, indicated by cross-hatched bar 34, charges the circuit and initiates a self-resonance which produces subsequent corona discharges (indicated by hatched bars 36 and 38). These are followed by another energizing pulse 34' and self-resonant pulses 36' and 38', and so forth.

A more realistic depiction of the intermittent energizing pulsing is given in FIG. 4. An energizing pulse indicated by arrow 40 charges the voltage envelope 42 of the reactor circuit up to a peak level 44. The reactor circuit then self-oscillates, as indicated by oscillating voltage trace 46, along a decaying envelope that reaches a minimum level at 48, immediately prior to the application of the next charging pulse 50. A brief corona discharge is produced during each resonant cycle, with the energizing pulses preferably timed to re-energize the circuit shortly before the termination of corona discharges due to the voltage decay. The frequency at which the energizing pulses are applied will generally be well less than half the reactor circuit's natural frequency, with each energizing pulse generally having a duration less than 10% of the resonant period. Alternatively, the circuit may be driven by a cw rf source impedance matched to the reactor-inductor load, and providing adequate high voltage.

Figure 5B:
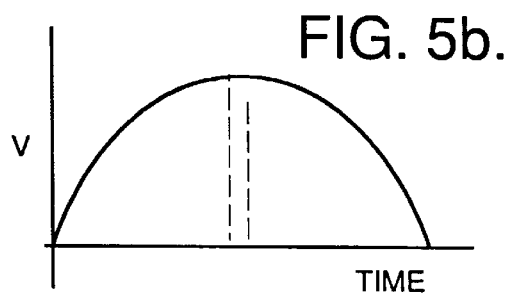
Figure 5C:
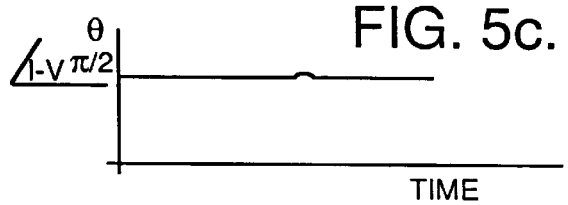

The frequency, phase and amplitudes of the reactor's voltage and current waveforms each appear to vary during the decaying oscillation. The voltage and current are almost π/2 radians out of phase with each other, yielding mostly reactive (imaginary) power, except for a brief period in the high-amplitude portions of each cycle during which real power is deposited. This behavior is believed to be caused by the positioning of the cylindrical electrode outside of the discharge chamber, causing it to form a capacitor in series with the capacitance of the reactor itself. This phenomenon is illustrated in FIGS. 5a, 5b and 5c. The current and voltage waveforms of FIGS. 5a and 5b are generally 90° out of phase with each other except for the charging period, indicated by shaded area 52 in FIG. 5a. During this period the current is slightly retarded in phase and becomes a working current that deposits real power. The phase (θ) variation during this interval is indicated in FIG. 5c.

Figure 6:
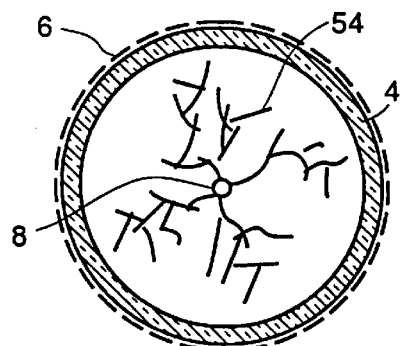
FIG. 6 is a sectional view of the corona chamber illustrating a corona discharge.
Figure 7A:
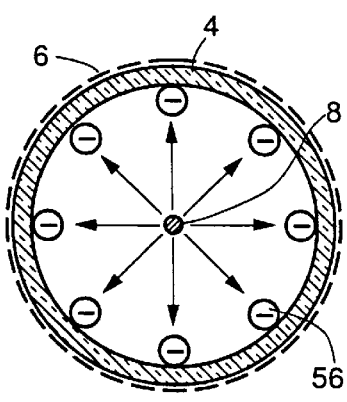
FIGS. 7*a*, 7*b* and 7*c* are sectional views of a corona discharge chamber illustrating the charging of the chamber wall during a discharge.
Figure 7B:
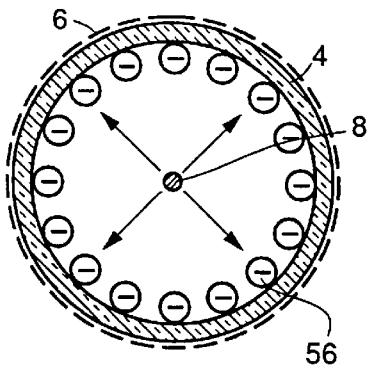
Figure 7C:
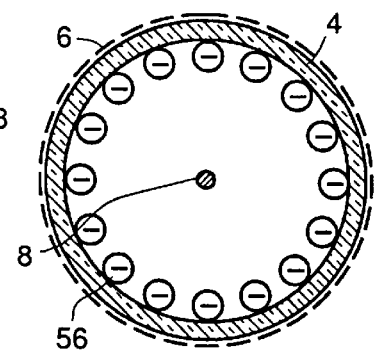

FIG. 6 illustrates a corona discharge within the reactor, with fractal-like streamers 54 building up and extending from the inner electrode 8 to the dielectric cylinder 4 that is surrounded by the outer electrode 6. The charging of the dielectric is illustrated in FIGS. 7a, 7b and 7c, with the resulting electrostatic potential across the dielectric illustrated in FIGS. 8a, 8b and 8c. During the beginning of each corona cycle, while the dielectric is charging, real power is deposited into the corona discharge. Once the dielectric has charged the power becomes reactive, and the discharge terminates. This process, characteristic of capacitively coupled discharges in general, has the beneficial effect of shortening the real power pulse. Short power pulses are important in improving specific energy because the low-energy tail of a long pulse wastes energy in heating the gas. With the self-resonant circuit topology of the invention, short pulses are achieved without complex circuitry or power waste.

Figure 8A:
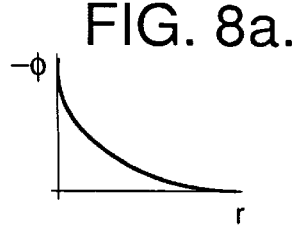
FIGS. 8*a*, 8*b* and 8*c* are graphs of the discharge chamber's dielectric electrostatic potential corresponding to the discharge sequence illustrated in FIGS. 7*a*, 7*b* and 7*c*, respectively.
Figure 8B:
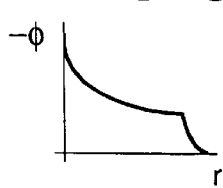
Figure 8C:
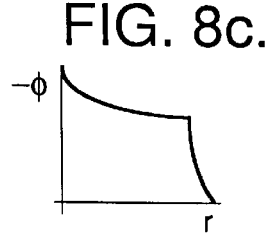

FIGS. 7a–7c illustrate the sequential charging of the reactor dielectric during a discharge, while FIGS. 8a–8c illustrate the corresponding electrostatic potential φ as a function of the reactor's radial coordinate r. At the beginning of a discharge (FIGS. 7a and 8a), a high negative electrostatic potential is present on the center electrode 8 relative to the metal outer cylindrical electrode 6. The presence of the dielectric 4 prevents arcing, since the corona pulses are typically shorter than arc formation times; the discharge is thus referred to as a silent discharge. Electrons 56 move towards the dielectric and begin to charge it; the electrostatic potential at the dielectric is nil prior to this charging.

As the corona discharge proceeds, the dielectric progressively charges up and its electrostatic potential increases, as illustrated in FIGS. 7b and 8b. The discharge terminates when the electrostatic potential on the inner surface of the dielectric approaches that at the inner electrode, at which time the dielectric has a maximum charge, as illustrated in FIGS. 7c and 8c.

Figure 9:
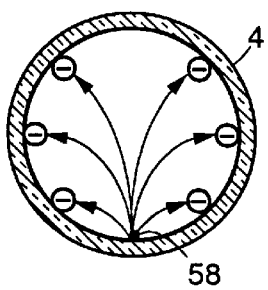
FIG. 9 is a sectional view of a corona discharge chamber illustrating an off-center inner electrode configuration.

We have discovered that the functionality of the corona reactor is not degraded even when the interior electrode is offset from the reactor's central axis to the extent that it lies against the inner reactor wall, as illustrated in FIG. 9. In this case the inner electrode wire 58 is shown resting against the bottom of the cylindrical discharge chamber 4. The corona discharge pulse is believed to take the form of a moving wave, charging the adjacent highest field areas of the dielectric first and then sweeping on to the next adjacent uncharged regions, until the charging has progressed all the way around the dielectric. The charging sequence typically takes about 10–20 nanoseconds. This type of geometry has important practical advantages in that it provides a reliable mechanical support for the inner electrode, and the dielectric mass also serves as a heat sink for the electrode.

An uninsulated wire has been found to work best as the inner electrode, although other configurations might also be used. A thin elongate blade that extended into the reactor through a wall of the corona chamber did not work as well, since it added to the overall capacitance and required more energy to charge while at the same time reducing the field concentration and thus requiring higher voltage. The inner electrode wire should be smooth so as to avoid localized discharge sites that interfere with the desired uniform discharge along the length of the electrode.

Figure 10:
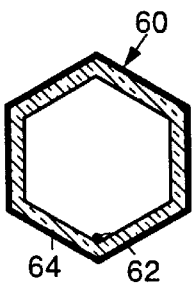
FIG. 10 is a sectional view of a polygon-shaped corona discharge chamber with an off-center inner electrode.
Figure 11:
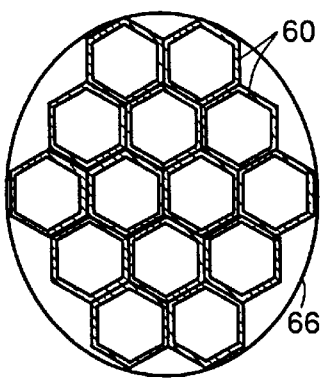
FIG. 11 is a sectional view of an array of parallel discharge chambers of the type shown in FIG. 10.

An alternate reactor geometry is illustrated in FIG. 10, in which the discharge chamber 60 has a regular polygon cross-section, in this case a hexagon. The inner electrode 62 is securely held in place by bonding along the chamber's lower vertex 64. An array of such hexagonal reactors 60 is shown in FIG. 11, with the reactors closely packed adjacent each other and oriented to support parallel gas flows. This results in a strong mechanical matrix, in which the individual reactors each require a lower charging voltage than would be required by a single large reactor with the same overall gas flow cross-sectional area. The inductor is preferably implemented with a single coil of wire 66 that can extend around the overall array for compactness.

Figure 12:
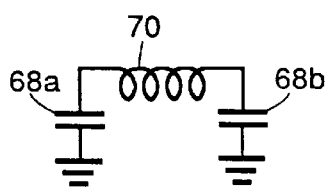
FIGS. 12 and 13 are schematic diagrams of ringing and parallel self-resonant circuits with multiple corona discharge chambers.
Figure 13:
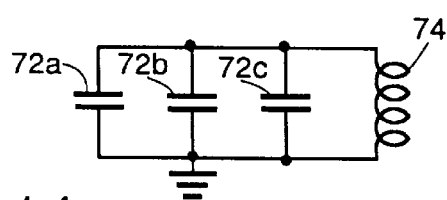

The circuit illustrated in FIG. 1 is a simple resonant circuit with a single capacitance connected in a loop with the inductor. Other circuit configurations are possible when multiple discharge chambers are desired. For example, FIG. 12 shows a ringing circuit in which a pair of corona reactors, illustrated as capacitive elements 68a and 68b, are connected in series on opposite sides of an inductor 70. In FIG. 13 three reactors 72a, 72b, 72c are shown connected in parallel with an inductor 74; additional reactors could be provided as desired.

The invention has been demonstrated with a corona reactor through which premixed gases were flowed that contained representative pollutants in air, with concentrations varying from about 100 ppm to over 1,000 ppm. The tested pollutants included benzene, toluene, xylene, butane, propane, perchloroethylene, trichloroethylene, acetone, $NO_2$, NO and exhaust from a portable four-strike generator. In each case an increasing destruction of the pollutant was observed with increasing reactor power, until the parent line of the pollutant disappeared below the instrumentation detection threshold. Importantly, the destruction of pollutants occurred without any evidence of the formation of nitrogen oxides; we have also shown the destruction of $NO_x$ introduced into the corona reactor.

Figure 14:
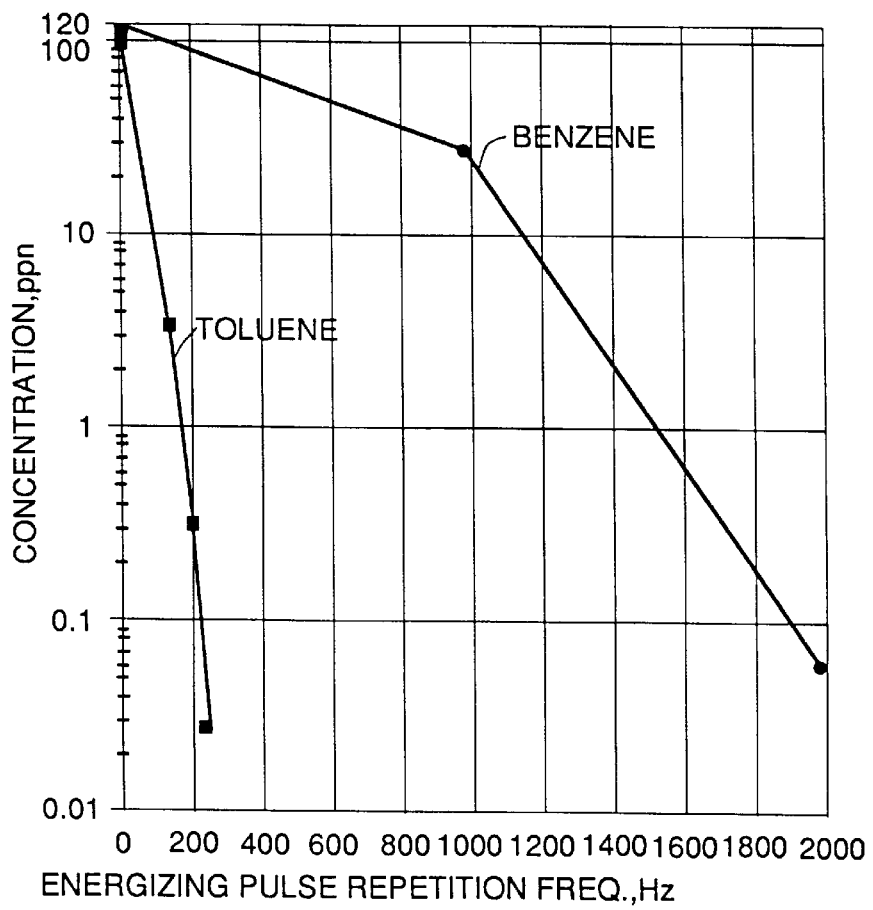
FIG. 14 is a graph showing the destruction of particular pollutants in a demonstration of the invention.

The reactor chamber was a silica cylinder 254 mm long, 2 mm thick with a 22 mm internal diameter. It exhibited a 7 pF capacitance, and was connected in circuit with a 16 microHenry inductor. The inner electrode wire diameter was 50–130 micrometers, and the gas flow rate was 50 cm$^2$/min, with a 4 kV power supply furnishing an energy of 25 microJoules per pulse. FIG. 14 shows the destruction of toluene and benzene in the corona reactor; more than three orders of magnitude (99.9%) of (DRE) was achieved. Comparable results were obtained for the other tested compounds, with energy requirements increasing with flow rate and pollutant concentration. Benzene was found to require the largest energy input of any compound tested, probably as a result of the stability conferred by its aromatic ring structure.

Some specific applications for the invention will now be discussed. In the control of pollutant exhausts from automobile engines and the like, presently available catalytic converters have approached their performance limits of 85–90% DRE; they are deficient in that they allow large quantities of volatile organic compounds (VOCs) into the exhaust both during cold starting and when the driver uses extra acceleration. In addition, typical catalytic converters impress a large back pressure on the engine, driving the engine into a more dirty operating regime and consuming significant power to force the exhaust gases through the converter.

It appears that a corona reactor as taught by the present invention could substitute for the conventional catalytic converter and achieve a better DRE for both VOCs and $NO_x$, and also eliminate much of the power required to force the exhaust gases through present converters. As compared to a power level of about 2.6 brake horsepower (bhp) required to force exhaust gases through the catalytic converter of a mid-size car under cruise conditions, it is expected that the present corona reactor would require about 1.3 bhp to remediate the engine exhaust at peak power. Perhaps even more importantly, the new corona reactor circuit can be throttled, i.e., its power can be adjusted in real time to provide extra destructive power (by increasing the repetition rate and/or magnitude of the energizing pulses) during hard acceleration or other pollutant-generating activities, and throttled down during cruising to improve fuel economy. It could even receive signals from an intelligent highway to increase pollutant destruction upon entering designated high smog cities, and by providing sensors in the exhaust gas stream the system could be made closed-loop by increasing the energizing pulse rate when an increase in pollutant level is sensed.

Companies involved in semiconductor operations are presently subject to strict daily emission limits of photoactive organic compounds. Staying within this limit is a costly procedure, requiring the weighing of solvent bottles and solvent waste containers morning and night, logging the weight changes, and computing the lost solvent weight on a daily basis. Costly treatment measures are required for companies that would otherwise emit larger quantities of solvents. One such treatment measure is incineration, involving the burning of large quantities of natural gas to combust the waste solvents. Another is to adsorb the solvents onto carbon and then ship the carbon off-site for reclamation or incineration. A site that uses this approach, assuming a very modest 125 cfm of air containing 300 ppm of VOCS, will experience costs of about $11,000 per month at present day levels. By contrast, the new corona reactor operating at 13 J/liter would cost about $55 per month, assuming electricity costs of 10 cents per kilowatt hour. In the case of either the invention or an incinerator, the treatment process would need to be followed by an aqueous scrubber if halogenated solvents are used.

Many power plants burn high-sulfur fuels, creating pollution consisting of oxides of nitrogen and sulfur ($SO_x$ and $NO_x$). The predominant advanced technology for $SO_x$ and $NO_x$ treatment, described in Chang et al., "Mechanism of Pulse Corona Induced Plasma Chemical Process for Removal of $NO_x$ and $SO_x$ from Combustion Gases", *Conference Record of the IEEE Industry Applications Society*, 1988, pages 1628–1635, involves the use of ammonia injection and electron beam excitation of the effluent. The electron beam catalyzes a reaction between the $SO_x$ and $NO_x$, and the $NH_3$, with the resulting ammonium nitrate and ammonium sulfate collected and used as fertilizers. It is expected that the invention will be able to remediate these pollutants much less expensively. In states with stringent air-quality laws, such as California, power plants burn natural gas to avoid the $SO_x$ pollutants; these plants do produce VOCs and $NO_x$, which are amenable to treatment with the present reactor.

Gaseous destruction is also important for closed or semi-closed areas in which the air is recirculated. For example, much of the surface area of floors, walls and ceilings in modern buildings is covered with plastics that outgas plasticizers and other compounds continuously. Toxic levels of these VOCs can accumulate in buildings which have insufficient fresh air circulation, adversely affecting sensitive individuals. Cars can suffer from the exhaust of other vehicles on the road, and in airplanes the recirculated air exposes the passengers to each other's air borne viruses. All of these problems should be amenable to treatment by the invention, which should oxidize viruses and bacteria down to carbon dioxide and water. Since the concentrations of these pollutants are not as high as those in a car exhaust, for example, only a relatively low power density would be needed to destroy them. In a car that was already equipped with an electronic catalytic converter, a second corona reactor in accordance with the invention could be powered from the same power supply.

While several illustrative embodiments of the invention have been shown and described, numerous variations and alternate embodiments will occur to those skilled in the art. For example, While the invention has been described in connection with the destruction of pollutants in gaseous flows, it may also be applicable to the removal to certain wastes in liquid flows. Such variations and alternate embodiments are contemplated, and can be made without departing from the spirit and scope of the invention as defined in the appended claims.

We claim:

1. A pollutant remediating corona discharge chamber, comprising:

a dielectric chamber having an inner wall and providing a flow path for a pollutant containing fluid, said dielectric chamber oriented along an axis, a distributed electrode extending around the outside of said dielectric chamber, and an elongate corona initiating electrode in the form of a straight wire mounted to and extending along the inner wall of said dielectric chamber generally parallel to the dielectric chamber axis and non-symmetrical along the length of the wire with respect to both the dielectric chamber axis and said distributed electrode, said inner electrode responding to radio frequency energizing pulses by establishing corona discharge pulses between itself and said inner dielectric chamber wall.

2. The corona discharge chamber of claim 1, wherein said chamber has a multi-vertex polygon cross-section, and said dielectric elongate electrode extends along one of said vertices.

3. The corona discharge chamber of claim 2, wherein said dielectric chamber has a regular hexagon cross-section.

4. The corona discharge chamber of claim 1, said elongate electrode comprising an uninsulated wire.

* * * * *